United States Patent Office 3,222,457
Patented Dec. 7, 1965

3,222,457
SUBSCRIBERS' METERING SYSTEMS
Francesco Ambrosino, London, England, assignor to International Standard Electric Corporation, New York, N.Y., a corporation of Delaware
Filed Sept. 10, 1962, Ser. No. 222,329
Claims priority, application Great Britain, Sept. 15, 1961, 33,191/61
6 Claims. (Cl. 179—9)

This invention relates to subscribers' metering and in particular to an arrangement for replacing the subscriber's electromechanical meter system by an electronic system in which the meter records are stored on magnetic tape.

The classical electromechanical system for subscriber's metering has the merit of simplicity and reliability. It has an inherent disadvantage however that a relatively complicated and laborious procedure is required to transfer the records to a form which can be easily used for preparing the subscriber's account. This disadvantage is, of course, magnified when the telephone traffic is heavy and when multi-metering pulses are used, since more frequent reading of the records becomes necessary.

An object of the invention is to provide subscribers' metering equipment wherein the above disadvantage is reduced or eliminated.

Another object of this invention is to provide register or storage arrangements for storing meter records and for transferring the stored records to magnetic tape recorders.

A further object of this invention is to provide magnetic-core matrices for storing meter information and electronic distributors for converting the stored information into a series of output pulses for operating read-in heads on tape recorder equipment.

According to the invention therefore there is provided electrical equipment for storing telephone subscribers' meter records on magnetic tape; in which meter pulses due to calls made from a group of subscribers' lines are stored on a matrix of magnetic cores of which each core is individual to one line of the said group; in which access and reading means are provided to convert continually all the information so stored in the said matrix into a series of output pulses, each denoting the arrival of a meter pulse from a line of the said group; in which translating equipment is provided and controlled by the condition of said access and reading means to express in any desired code the number of the line corresponding to each said output pulse as it occurs; and in which are provided a temporary store to store in succession in the said code the numbers of the lines corresponding to said output pulses and transfer control means to transfer successively the contents of said temporary store to said magnetic tape, the capacity of the said temporary store being determined by the expected rate of arrival of output pulses and the permissible rate of storage on said magnetic tape.

An embodiment of the invention, with an alternative embodiment for the meter pulse store portion, will now be described with reference to the accompanying drawings, in which.

In the main embodiment, the meter pulses for each subscriber's line in the exchange are arranged to set a magnetic core individual to each line. These cores are arranged in a matrix, corresponding to a group of subscriber's lines of suitable size, and are of the well-known type which can be set to either of two definite magnetic states by current pulses in one or more windings or threaded wires and in which the change of magnetic state can be detected as a current pulse in an output winding or threaded wire. The meter pulse store thus formed is continually scanned, at such a rate that the complete scanning cycle is shorter than the minimum time between meter pulses. The line number corresponding to any meter pulse thus found is stored in a temporary store, also consisting of magnetic cores, and transferred to the magnetic tape store at a slower rate appropriate to this type of store. The embodiment also contains various features to improve the recording of meter pulses, as will be described.

*Reception of meter pulses (main embodiment)*

Figure 1:
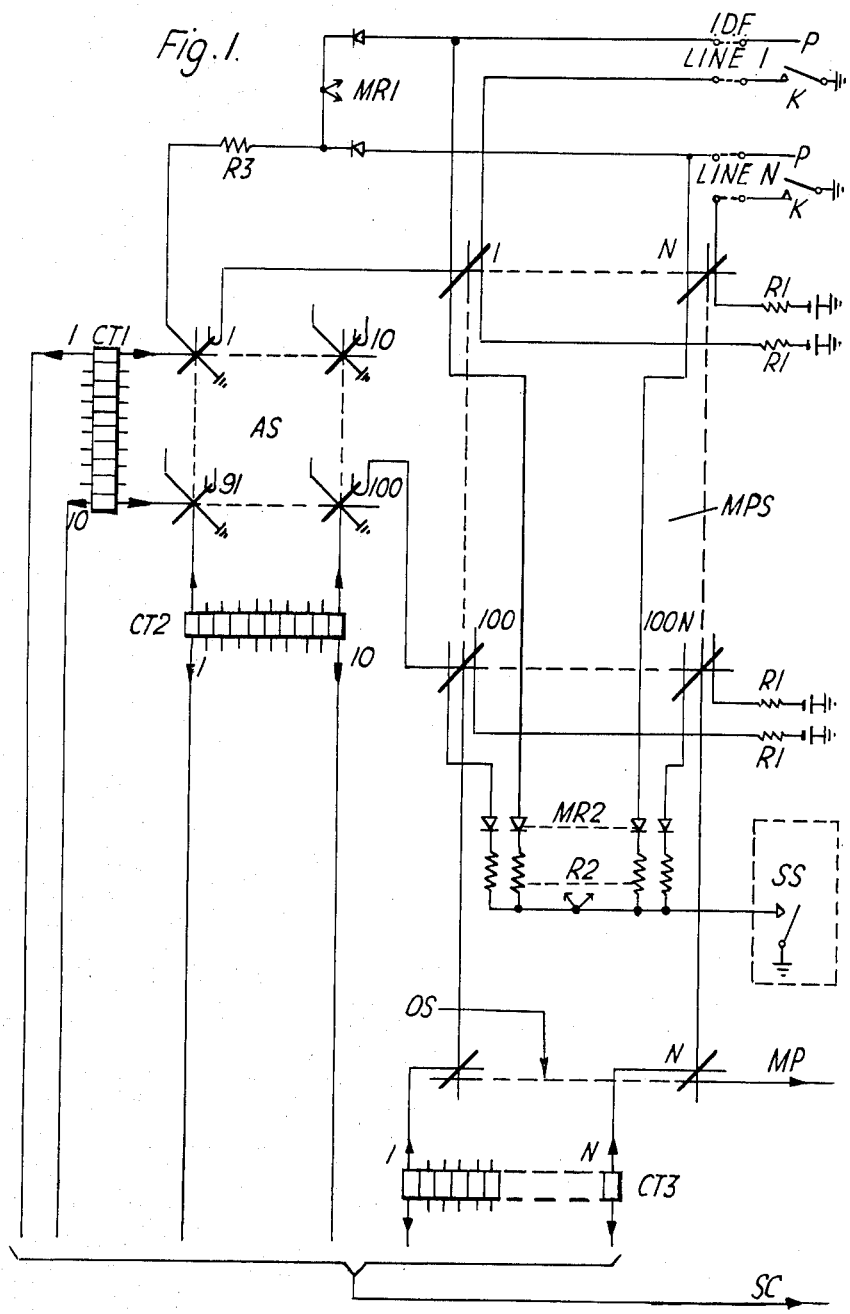
FIG. 1 shows a meter pulse store, associated scanning equipment, and connections to subscribers' lines, FIG. 2 which should be placed to the right of FIG. 1, shows a temporary store, associated control equipment, and connections to a magnetic tape store.

In FIG. 1 the meter pulse store MPS consists of 100 rows of magnetic cores, having N cores in each row, each core being connected to one subscriber's line in the group of 100 N. In the diagram only the corner cores of the matrix are shown, all the others being similarly wired. The private wire P, and a contact of the cut-off relay K, are shown for each of two lines, line 1 and line N. The number N is chosen having regard to equipment convenience and traffic density, e.g.—20 giving a 2000-line group.

Each core of the matrix is threaded by four wires. The input wire is taken from the private wire P of the corresponding line circuit through the lines core, and then through an individual decoupling rectifier MR2 and current-limiting resistor R2 to the common static switch SS. The output wire passes through all the cores in a column and terminates in a core of the output store OS. The biassing wire is energised by the K contact of the line circuit via an individual resistor R1. The reading-out wire passes through all the cores in a row and originates from a core in the Access Selector AS.

The Access Selector AS consists of a square matrix of 100 magnetic cores, each with three threaded wires and an output winding having a few turns. As before, only the corner cores are shown, the others being similarly wired. Each output winding is connected to one of the 100 rows of store MPS. The biassing wire, shown earthed, is connected via resistor R3 and decoupling rectifiers MR1 to the P wires of the N line circuits corresponding to the row of MPS.

It will be noted that, since the drawing FIG. 1 is a mixture of logic diagram and circuit diagram, battery and earth symbols are shown only for the circuit diagram portion, i.e. the direct connections to the line circuits.

Two 10-point electronic counters, CT1 and CT2, are provided to step the Access Selector AS. These may be of the well-known type employing a chain of coupled transistors, controlled by a driving pulse (not shown) so that an output pulse is produced on each of the output leads in turn at a regular rate, and each output pulse energises the cores in the corresponding row or column of AS. CT2 operates at ten times the frequency of CT1, and each core of AS is able to be set from one magnetic state to the other by the simultaneous application of a pulse from CT2 and a pulse from CT1, but not by either pulse alone. Hence a series of output pulses is produced from AS and applied therefrom to the rows of store MPS one after the other.

Metering pulses are of positive polarity, and arrive on the line circuit P wires at variable times but with a determined minimum interval e.g. 1 second on any one line, and a determined duration e.g. 200 ms. Any core of store MPS will be set by the simultaneous application of a meter pulse current in the input wire and a bias current in the biassing wire, but not by either current alone. The arrival of a meter pulse during a call, assuming switch SS is closed, will therefore set the corresponding core. This biasing arrangement lessens the risk of faulty core setting due to either maintenance work in the exchange, or hunting of subscriber's line switch over outlets of other metering subscribers.

The Access Selector AS is stepping continuously at such a rate that all 100 rows of MPS are pulsed in a time less than the minimum interval between meter pulses on any one line. The direction of the Access pulses is such that any core of MPS which has been set by a meter pulse will be reset, and will therefore produce an output pulse. This in turn will set the core of the Output Store OS which terminates the column of MPS in which the core of MPS is situated. Thus for each row of MPS all the N cores are read simultaneously and pulses from any cores set by a meter pulse will set corresponding cores in output store OS.

A third counter CT3, similar to the previous ones, is provided to scan the store OS, and steps at N times the speed of CT2. CT3 therefore scans the N cores of OS immediately after each row of MPS has been energised. The CT3 outputs reset the set cores of OS in turn so that a pulse is emitted along lead MP for each core reset in output store OS. Output store OS is thus ready after each scan to receive pulses from the next row of the meter pulse store MPS. Thus the lead MP carries a series of pulses, each one representing the arrival of a meter pulse on one line in the 2000-line group. These pulses will be hereinafter referred to as MP pulses.

The presence of the rectifiers MR2 prevents the setting of cores due to negative potentials on the P wire, but it is possible that spurious positive pulses may occur due to normal exchange switching operations. These will generally however be much longer and stronger than is required to set a core. The static switch SS is arranged to close the common earth to the core input circuits for a very short time at regular intervals. These intervals are shorter than the length of a meter pulse, e.g., 150 millisecs. for 200 millisecs. meter pulse. But the time of closure need be only slightly longer than the time to set a core e.g. 10 microsecs. This arrangement is described in a copending patent application entitled "Electrical Pulse Arrangements," Serial No. 185,421, filed April 5, 1962 by E. H. Bray and F. Ambrosino and assigned to the assignee of this invention, and reduces to a negligible value the risk of a fault due to spurious positive pulses.

This use of the static switch SS does however mean that for most of the duration of a meter pulse the corresponding core, although remaining set, carries no setting current. It may therefore be reset by the first reading pulse, and then set again by the next switch SS operation after this reading pulse has passed, before the end of the meter pulse, and then reset a second time after the end of the meter pulse. This would give two detections of the same meter pulse. To avoid this fault, the biasing wire of each core of access selector AS is arranged to inhibit the production of an output pulse from AS if the meter pulse is still present on any line of the row of the store MPS served by this core of AS. Thus a row of the store MPS is not read if there is a meter pulse still present on any line of that row. This may cause reading delays, but these are reckoned as neglible in practice, since in a group of lines the meter pulses, which generally originate in a common generator are more likely to be concurrent than consecutive.

There may be cases in which it is difficult to obtain the correct current in the biassing winding of the access selector AS core, because it is derived from a positive battery which is common to the whole exchange and which has a very variable load. In such cases it could be advantageous to replace the magnetic core matrix AS by a transistor switching network each core being replaced by a transistor and coincidence gate with associated circuitry. The biassing winding input and the inputs from CT1 and CT2 would then become inputs to this 3-input coincidence gate, the biassing input being inhibiting. The gate thus opens when signals from CT1 and CT2 coincide with no meter pulse on the line, and operates the transistor, which in turn sends an output pulse to the row of MPS. This variant is however not shown in the drawings.

Storage of meter recordings

Figure 2:
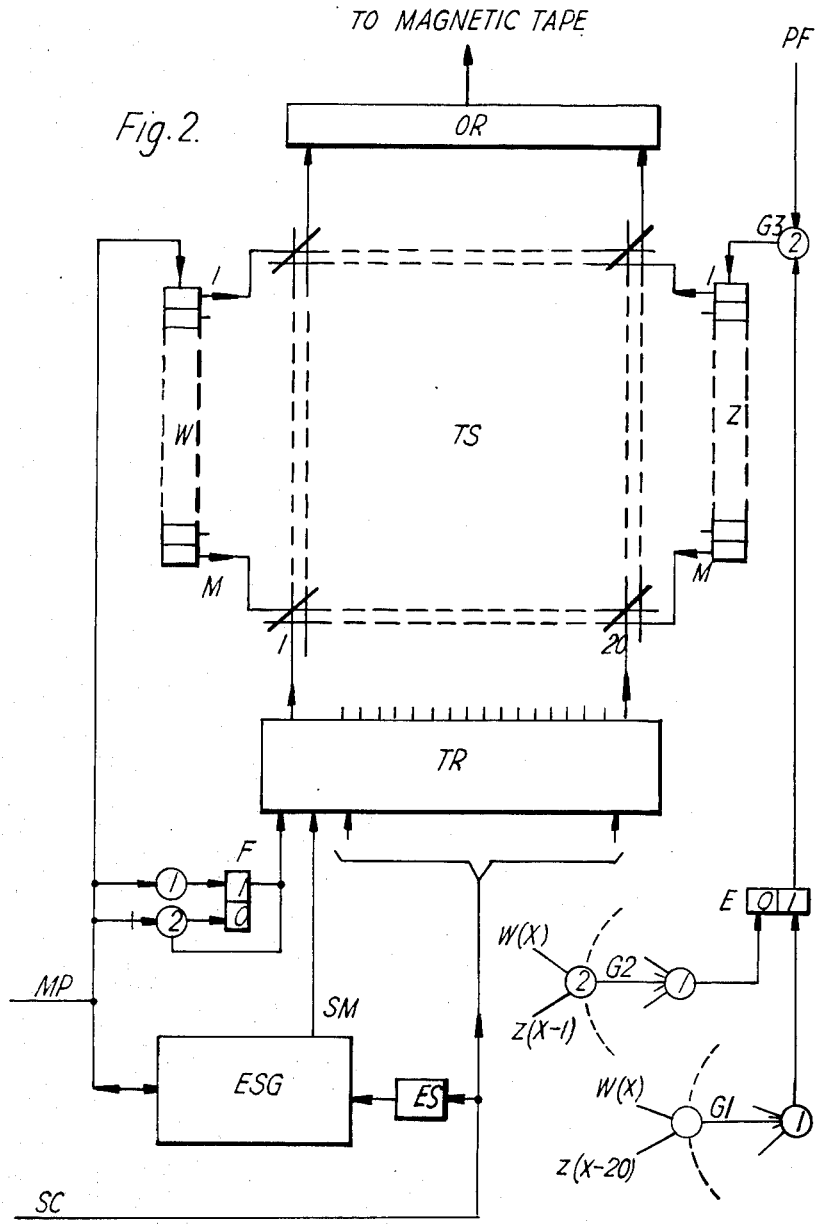

In FIG. 2 is shown a Temporary Store TS, consisting of a matrix of magnetic cores, having 20 cores in each row and M in each column. As before, only the corner cores are shown, the others being similarly wired. The main reason for store TS is to store the metering information from FIG. 1 while it is being transferred to the magnetic tape recorder MTR, which is a much slower operation. The value of M is determined by the expected amount of metering information which may accumulate in store TS due to the slower tape operation.

Each core of store TS has four threaded wires as shown. The input wire is common to all cores of a column and originates in a Translater TR. The output wire is common similarly and terminates in an Output Register OR.

Two electronic circulating distributors, W and Z, are provided, each of which has M number of outlets and may be similar to the previously mentioned counters in general construction. Each of the outlets of distributor W is connected as shown to a wire threading all the cores in a row of store TS, and each of the outlets of distributor Z similarly to another wire. The driving connection for each distributor is shown at the end of its drawing symbol.

The outlets of the three counters in FIG. 1, besides driving AS and OS, are also taken to the translator TR in FIG. 2 over a set of (20+N) leads represented by the lead SC. The position of the counters at any instant determines the number of the subscriber's line for which at that instant the record of a meter pulse, if one has been received, is being transmitted as an MP pulse (FIG. 1). The function of TR is to translate this number representation into four numerical digits, each in 2-out-of-5 code. This is done by a network of electronic gates, functioning in the usual well-known manner, not shown on the drawing in detail but indicated by TR.

On the arrival of one MP pulse, distributor W, which may be in any position, is stepped to its next position, and also the appropriate gates in translator TR are activated through the toggle or flip-flop F. This produces outputs from translator TR, according to the code of the subscriber's line corresponding to the MP pulse, on the 20 outputs going to the output wires of the cores of store TS. Each core can be set by the combination of a pulse from an output of W and a pulse from an output of TR, but not by either alone. Thus the 2-out-of-5 code of the subscriber's line is stored in the row on which W is standing.

The distributors W and Z are actually stepped by a "strobe" pulse, in the usual manner, which is synchronous with the driving pulse of the fastest counter CT3. There is therefore a risk that the translator TR output will appear before W has stepped, and toggle F is inserted to avoid this by delaying the activation of the translator TR gates by one strobe pulse interval.

Thus store TS continues to accumulate line numbers corresponding to meter pulses received. The toggle or flip-flop E is controlled by two sets of M number of gates, gate G1 on the "1" side and gate G2 on the "0" side. The controls of these gates are as shown, where X includes the position from 1 to M for the M gates successively. When distributor W has stepped to a position which is, say 20 beyond the present position of Z, one of the gates G1 will open; e.g. if Z is presently at position 3, the gate G1 having inputs W23, Z3, will open when W reaches position 23. Toggle E then operates to state "1", and its output steps distributor Z to position 4 via gate G3. Assuming some of the cores in row 4 are set, indicating a line number, the output of Z resets these cores, which thus give outputs to the Output Register OR. This equipment contains the necessary apparatus to receive these outputs and energise correspondingly the writing head or head on the magnetic tape, so that the line number appears thereon. During this "printing" the condition of lead PF (from the tape machine) keeps gate G3 closed and inhibits further stepping of Z. When "printing" is finished, lead PF restores gate G3, E being still in "1", so that Z continues to step and read out.

Thus distributor W continues to step whenever an MP pulse arrives, and distributor Z steps steadily to transfer the accumulated line numbers to the tape. If MP pulses cease for a while Z will catch up on W, and when it stands one position behind W one of the gates G2 will open and restore toggle E. No more stepping of Z then takes place until there is again a 20 position difference between the two distributors. This figure of 20 may, of course, be any other figure if desired, providing it is less than M.

The functions of the End of Scan Generator ESG shown in FIG. 2 is to avoid faulty indications due to a split meter pulse. If a split meter pulse arrives on the P wire of a line, and if the core of store MPS is read during the period of split, two meterings will be indicated instead of one. To deal with this fault, it is arranged to mark on the tape record the position of the end of any scan during which any meter pulse has been recorded, and also the end of the immediately succeeding scan even if no meter pulses have been recorded. Both readings, in the case of a split meter pulse, are allowed to be recorded. The scanning frequency is set so that the time of one scanning cycle is less than half the minimum interval between pulses. Then it will be seen that if the same line number appears twice on the tape and separated by only one end-of-scan marking, it must have been due to a split pulse and one of the two readings can be disregarded. However, if the two appearances are separated by two or more such markings, with or without other numbers between the markings, it must refer to two separate calls on the same line. However it is obviously unnecessary and space-wasting to record the end-of-scan marking for any "unused" scan unless it follows immediately a "used" scan.

The Generator ESG is a network of electronic toggles and gates constructed so as to produce an end-of-scan signal, controlled by the end-of-scan position and MP pulses, such that the signal is given at the end of every scan if an MP pulse has been received during the scan or during the preceding scan. The instant of the end of the scan can be given simply by combining the end positions of the three counters of FIG. 1, in a circuit indicated by ES (FIG. 2) but not shown in detail. MP pulses are fed in to ESG (as shown by the incoming arrow to generator ESG). The end-of-scan marking signal is sent from generator ESG to translator TR over the lead SM, and causes the gates in translator TR to produce a special output, which may be anything not corresponding to a line number in the exchange. At the same time generator ESG steps distributor W (as indicated by the outgoing arrow from generator ESG to the MP lead), so that the marking signal is stored on store TS and eventually on the magnetic tape.

*Reception of meter pulses (alternative embodiment)*

The arrangement shown on FIG. 1 for the connections to the line circuits is chosen so as to require no changes in the line circuit itself from the standard circuit. Where however, as possibly in new exchanges, line circuit can be modified, an easier arrangement would be to remove the circuit given by K contact, core winding, and R1 resistor, and to wire this K contact in series with the point marked P on FIG. 1. The core would be set fully by the current in the winding connected to P, so that the non-operation requirement on partial energisation would not arise. The K contact would prevent trouble due to maintenance work as before, and the resistor and fourth core winding would be saved.

Figure 3:
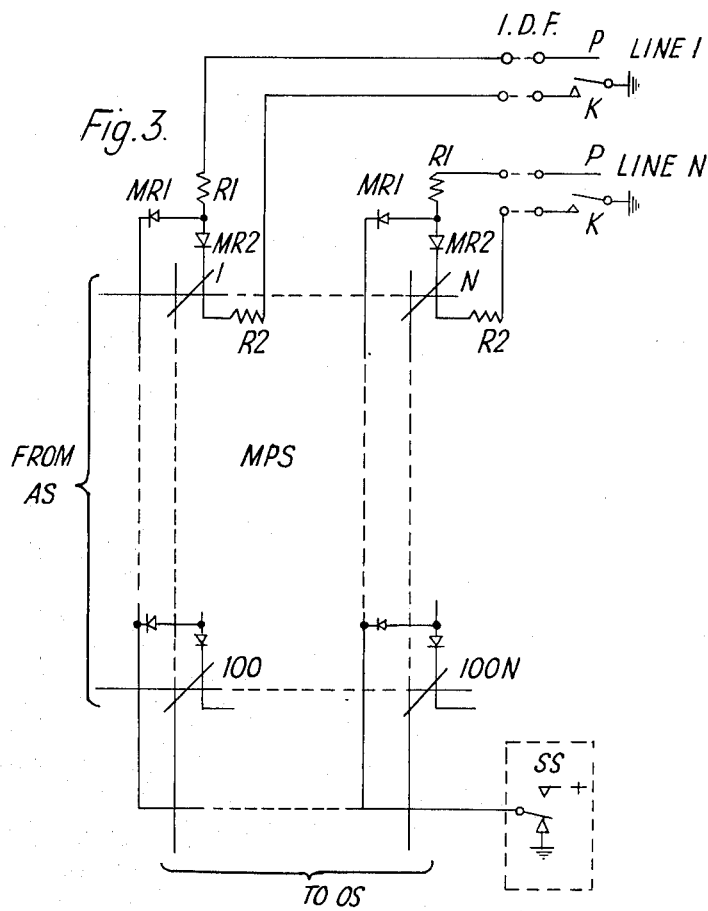
FIG. 3 shows a second embodiment for the meter pulse store MPS, alternative to that shown in FIG. 1.

In situations where the line circuit cannot be changed, an alternative arrangement for the meter pulse store is shown in FIG. 3. This uses no more components than does FIG. 1, and has the merit of avoiding the partial energisation requirement in the meter pulse store MPS, and also in the Access matrix AS, and eliminating one core winding on all cores.

Each core input winding is in a "local" series circuit consisting of P wire, resistor R2, rectifier MR1, resistor R1 and K contact. Thus the core will be set by a meter pulse, rectifier MR2 functioning as before and K contact functioning as in the above modification of FIG. 1. The operation of static switch SS is reversed from that in FIG. 1, in that earth now normally short circuits all core input windings via decoupling rectifiers MR1 but this short-circuit is removed for a very short time at regular intervals. Thus SS has the same effect as before, but its operation in parallel instead of in series permits the use of the series circuit for K contact. Actually the ground on SS "contact" is changed over to the same positive potential as the meter pulse potential, which assists the decoupling of the core circuits when switch SS operates and is also easier to obtain with a static (electronic) switch than an actual disconnection would be.

Since the core is set by a meter pulse and reset by a sending pulse, these two pulses must be equal and opposite in effect, so that a set core cannot be reset and read while the meter pulse is present and switch SS is operated. But it can be read while switch SS is normal, with or without the meter pulse, and also when switch SS is operated and the meter pulse has finished. If therefore it is arranged to read only while switch SS is operated, effective reading will not occur while the meter pulse is present but will occur at the first switch SS operation after the meter pulse has finished. The basic pulse generator is therefore made to produce driving pulses for counters CT1 and CT2 times in relation to the switch SS operating pulses so that each reading pulse from matrix AS coincides with an operation, e.g. every fifth operation, of switch SS.

Thus this device avoids double detection of one meter pulse, such as was described in connection with FIG. 1, without the necessity of any inhibiting circuits on the cores of matrix AS. Since a switch SS operation coincident with a reading pulse cannot set a core, the switch SS operation interval is made somewhat less than half the meter pulse duration, so that any meter pulse will always find at least one switch SS operation which is noncoincident with a reading pulse and which can therefore set the core.

The meter pulse store of FIG. 3 may of course be used with either the magnetic core matrix AS of FIG. 1 or with the transistor network already described for AS as an alternative.

*Large exchange arrangements*

The above description refers to arrangements for a single subscriber's line group, e.g. 2000 lines, whose size is limited by considerations of decoupling efficiency and equipment convenience. In a larger exchange several groups may be used, each being as already described and shown in FIG. 1 or FIG. 1 modified by FIG. 3 except for the Output Store OS and the counter CT3. The store OS would be enlarged by an additional row or rows, all the cores being threaded on the one output to the MP lead. An additional counter would be supplied which by combination with CT3 would scan all the cores. In FIG. 2 it would generally be necessary to increase the capacity M of the Temporary Store TS.

It is to be understood that the foregoing description of specific examples of this invention is not to be considered as a limitation on its scope.

What I claim is:

1. A telephone subscriber metering system for storing telephone subscriber meter records prior to recording on magnetic tape at a certain recording rate comprising a group of subscriber lines, a meter pulse magnetic core matrix having each core of said matrix individually associated with one of said lines, coil means capable of individually setting said cores responsive to electrical meter pulses on an associated calling one of said lines, enabling means for periodically enabling said coil means to transmit said meter pulses, reading means for continuously converting said stored electrical meter pulses to output pulses, translating means operated responsive to the operation of said reading means and said output pulses for translating said output pulses into coded pulses designating said associated calling line, temporary storage means operated responsive to said output pulses and said coded pulses for storing in succession the coded pulses, and tranfer control means operated responsive to an anticipated arrival rate of said coded pulses and said certain recording rate for successively transferring the stored coded pulses from the temporary store to said magnetic tape.

2. In the telephone subscriber metering system of claim 1 wherein said reading means includes magnetic cores arranged in an access matrix.

3. In the telephone subscriber metering system of claim 1 wherein a meter pulse matrix bias winding is provided for each core of said meter pulse magnetic core matrix, coupling means for coupling each of said bias windings to said associated line and contact means for transmitting bias current through said bias winding when said associated line is in a calling condition.

4. In the telephone system of claim 2 wherein said access matrix includes access matrix bias windings for inhibiting the said conversion of meter pulses of an associated calling line to output pulses while meter pulses are on said associated calling line.

5. In the telephone subscriber system of claim 4 wherein said temporary store comprises a plurality of rows, a plurality of storage devices in each row for storing a line number per row, first electronic counter means operated responsive to said output pulses for enabling each row in succession to store line numbers received from said translator, and wherein said transfer control means comprises a second electronic counter for transferring the line numbers from said temporary store to said magnetic tape, electronic gate means for controlling said second electronic counter and means for operating said gate means responsive to the relative position of the first and second counters to enable the said second counter to start operating when the number of occupied rows of said temporary store reaches a given number determined by the anticipated arrival rate of output pulses and the certain recording rate.

6. In the telephone subscriber metering system of claim 5 wherein end of scan generator means are provided for indicating when said reading means has completed reading out the meter pulse magnetic core matrix and converted said meter pulses to output pulses.

References Cited by the Examiner
UNITED STATES PATENTS

| | | | |
|---|---|---|---|
| 2,854,517 | 9/1958 | Heetman | 179—18 |
| 2,955,166 | 10/1960 | McCreary | 179—18 |
| 2,956,271 | 10/1960 | Keller | 340—166 |
| 3,067,290 | 12/1962 | Greenaway et al. | 179—7 |
| 3,075,046 | 1/1963 | Nervik | 179—8 |

ROBERT H. ROSE, *Primary Examiner.*